W. L. BODMAN & M. G. RHEINSTROM.
PITTING DEVICE.
APPLICATION FILED MAR. 20, 1909.
1,010,848.
Patented Dec. 5, 1911.
2 SHEETS—SHEET 2.
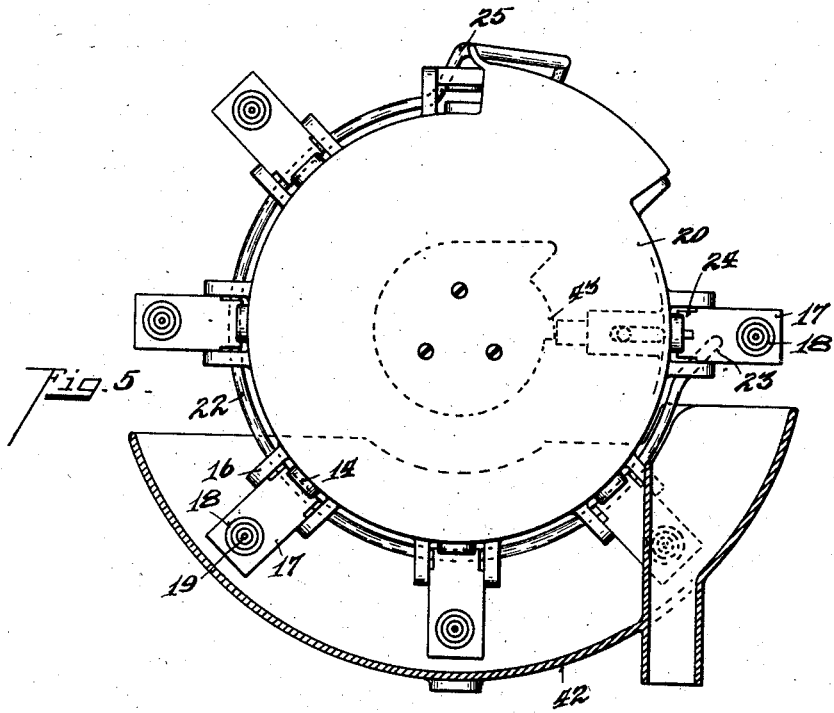
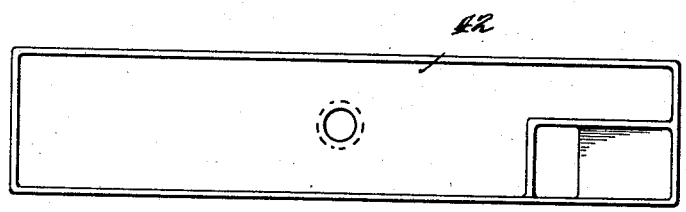
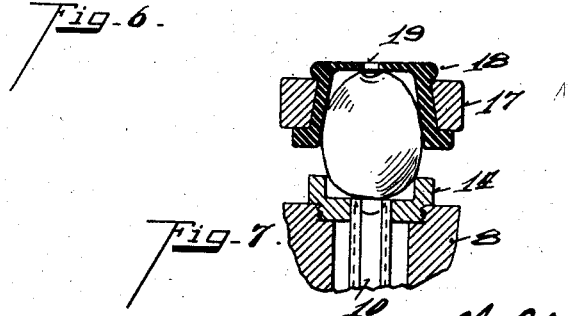

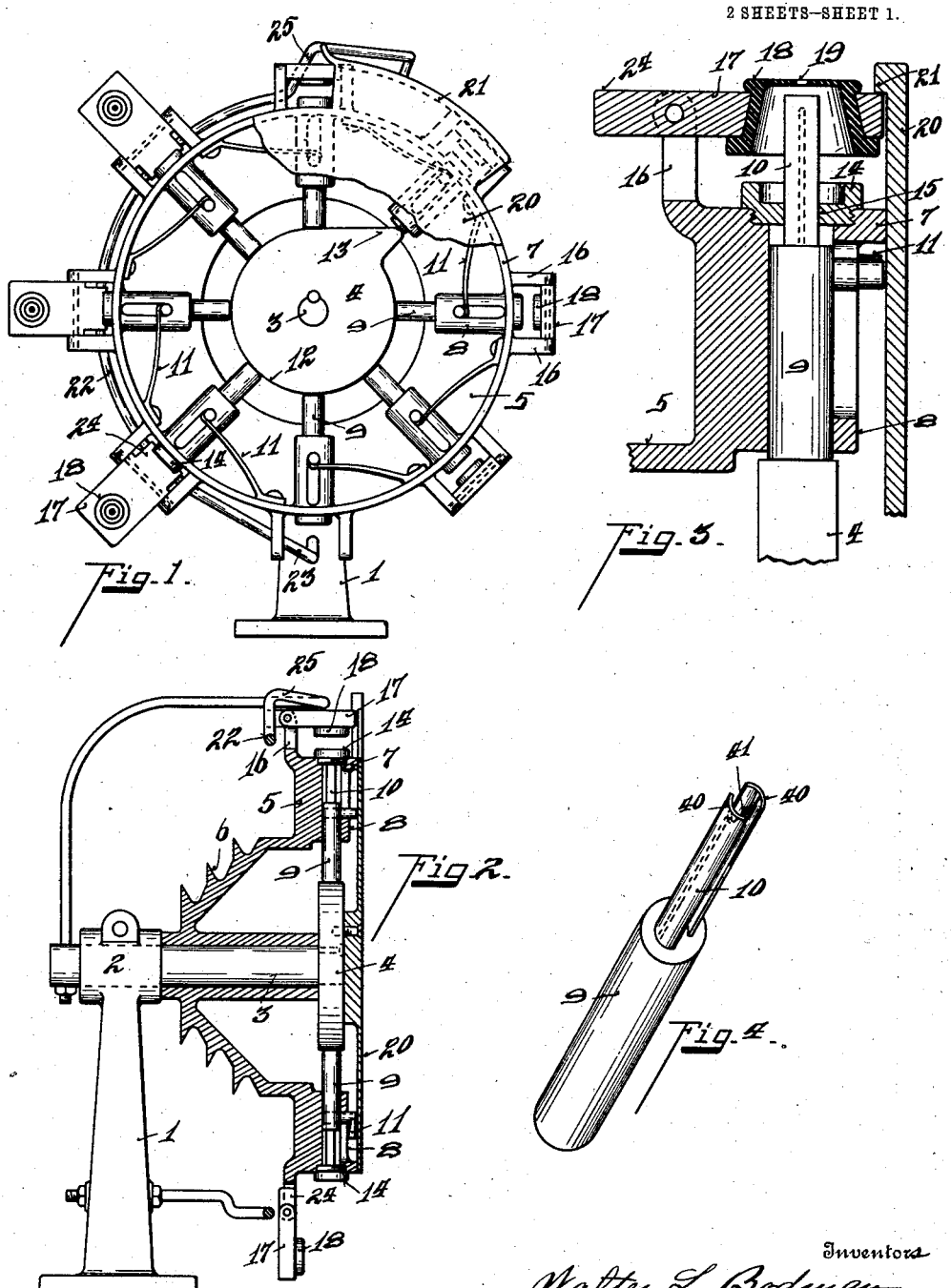

UNITED STATES PATENT OFFICE.

WALTER L. BODMAN, OF COVINGTON, KENTUCKY, AND MAURICE G. RHEINSTROM, OF CINCINNATI, OHIO, ASSIGNORS TO ISAAC RHEINSTROM, OF CINCINNATI, OHIO.

PITTING DEVICE.

1,010,848.  Specification of Letters Patent.  Patented Dec. 5, 1911.

Application filed March 20, 1909. Serial No. 484,706.

*To all whom it may concern:*

Be it known that we, WALTER L. BODMAN, a subject of the Kingdom of Great Britain, residing at Covington, in the county of Kenton, State of Kentucky, and MAURICE G. RHEINSTROM, a citizen of the United States, residing at Cincinnati, in the county of Hamilton and State of Ohio, have invented certain new and useful Improvements in Pitting Devices, of which the following is a specification.

Our invention relates to a fruit pitting machine, such as olives, cherries, etc.

The object of the invention is to provide a simple mechanism in which the fruit can be rapidly and conveniently pitted without substantial disfigurement.

In fruits of this character it is not only desirable to preserve the natural contour and physical form of the fruit from an artistic point of view, but there is less likelihood of destructive action where the fruit is preserved substantially intact.

Our machine broadly involves a rotary fruit carrying wheel with radial pitters adjacent the individual fruit holders operated by the rotation of the wheel to strike upwardly through the fruit, to expel the seed outwardly through the stem axis, the fruit being placed in the individual holders, stem end upward, to properly present the fruit to this method of attack.

The features of the invention are more fully set forth in the description of the accompanying drawings, forming a part of this specification, in which:—

Figure 1 is a front elevation with part of the cover of the cover plate broken away. Fig. 2 is a central vertical section. Fig. 3 is an enlarged central vertical section through one of the fruit holders, showing the position of the plunger pitter at the end of its operation. Fig. 4 is a perspective view of the plunger pitter. Fig. 5 is a side elevation showing the position of the cleansing tub. Fig. 6 is a top plan view of the tub. Fig. 7 is an enlarged detail sectional view of one of the holders, showing a cherry supported in position for pitting.

1 represents the frame of the machine which is preferably an ordinary pedestal having a clamp sleeve 2, in which is horizontally supported the fixed shaft 3.

4 is a cam disk secured on the free end of shaft 3. It is, of course, stationary. The fruit pitting instrumentalities consist of a series of independent fruit holders and pitters mounted on a wheel rotatable around the cam 4 and coöperating with devices rigid with the frame for automatically opening and closing the lids of the fruit holders.

5 represents the wheel rotatable on shaft 3 and positioned between the sleeve 2 and the cam disk 4. Preferably, it is cone-shaped having the step belt wheels 6 and the outer peripheral flange 7 overlying and vertically coincident with cam disk 4. Upon this periphery 7 of wheel 5 is formed a series of radially extending sleeves 8, see Fig. 3, in which are mounted plungers 9, having the split tubular pitters 10 at their upper ends. The inner ends of these plungers ride upon the periphery of the cam disk 4, being normally pressed in this position under tension by springs 11. The uniform circular portion of the periphery 12 holds the plungers normally in inoperative position and the cam projection 13 throws the plungers outwardly in the operation of pitting the fruit. Upon the upper end of the sleeve 8 is a fruit seat 14, screw threaded into position and having a central orifice 15 through which passes the pitter 10, as shown in Fig. 3. From the rear side of the sleeve 8 is projected a pair of brackets 16, between which is hinged a lid 17, carrying an elastic cup-shaped fruit cap 18, having a central orifice 19, concentrically alined with the pitter 10 when the lid is down.

We preferably provide the following devices for controlling the lid:—20 is a front covering plate secured to the front face of disk 4 and provided on its inner face with the peripheral flange 21, adapted to form a latch for the free edge of the lid. 22 represents a wire forming the segment of a circle around the wheel 5, its ends being secured to the lower portion of the pedestal 1 and to the inner end of shaft 3, as shown in Fig. 1. Its lower portion has a bent loop 23, adapted to be engaged with the inner ends 24 of the hinged lids to automatically swing them to the open position, shown in Fig. 2, the wire then being bent to hold the lids in this position as the fruit holders travel from the bottom to the top of the machine, the fruit being inserted in this portion of the travel. The upper end of the wire has a bent loop 25, which automatically closes the lids at the position in which the pitting is to be effected, and when the lids are closed the outer ends ride under the flange 21 of the stationary plate 20 and are latched in closed position, so as to hold the fruit securely to the action of the pitter. During this portion of the travel of the wheel the cam shoulder 13 actuates the plungers 9 serially.

We prefer a pitter formed, as shown in Fig. 4, with segmental and separated cutting edges 40, and a diaphragm 41, diametrically between them, (see dotted lines, Fig. 3). With this form, the notched end of the member 41 engages the seed as soon as the cutters penetrate beyond the surface of the fruit, and has the function of applying a driven or ejecting force to the seed in the direction of the stem joint. Under this influence, the seeds in practical operation, are popped out through orifices 19 and fly quite a distance.

Preferably, the fruit is laid upon the seats 14 stem-end or mouth upward, that is, with the stem axis of the fruit concentric with the orifice 15 of the seat, so that when the lid is closed the orifice 19 will lie just over the stem joint of the fruit. In this position, the pitter engages the seed and forces it outwardly through the line of the stem joint, so that the seed is ejected very much as a boy shoots a cherry stone by squeezing it between his fingers. The elastic cap 18 accommodates itself to the pressure of the fruit under the influence of the action of the pitter and the orifice being also elastic accommodates itself to the different sized seeds. When the fruit is pitted in this way, there is very little appreciable rupture of the skin, there being simply the lines of perforation of the split cutter tube 10, and the action of the elastic cap 18 presses the fruit downwardly upon its seat as the pitter 10 is withdrawn, so that its contour is substantially preserved intact. The fruit drops out automatically into a suitable receiver at the lower diametrical portion of the wheel when the lids are automatically opened. We preferably employ a tub 42 embracing a lower portion of the wheel and supplied with water for cleansing the fruit holders and pitters.

This machine can be readily operated by an unskilled hand, and the fruit rapidly and efficiently pitted without appreciable injury in either condition or appearance.

It is desirable to rapidly eject the fruit after it has been pitted, and to accomplish this we have provided the cam disk 4 with a second shoulder 43 which actuates the plungers 9 slightly, disengaging the fruit from the seat 14, as illustrated in Fig. 5.

Having described our invention, we claim:—

1. A fruit pitter, having a series of holders, each independent holder comprising an inner fruit support and outer hinged lid therefor, said lid and support being formed with alined orifices, a plunger having a pitter adapted to enter one of said orifices and force the seed out through the other orifice, means for carrying said holders to a position of operation, and means for operating the plungers, substantially as described.

2. A fruit pitter, having a series of holders, each comprising a bottom seat and hinged lid opening upwardly, said parts being provided with orifices adapted to be alined axially relative to the fruit and support the fruit stem end upward, a pitter operating through the bottom orifice of each holder, and means for operating said pitter, substantially as described.

3. A fruit pitter, having a series of fruit holders, each comprising a bottom seat, a hinged elastic lid opening upwardly and adapted to clamp the fruit in position stem end upward, said holder members being provided with orifices adapted to be alined with the stem axis of the fruit, a pitting instrumentality operating through the bottom orifice of each holder to eject the seed through the elastic top opening, and means for actuating said pitters, substantially as described.

4. A fruit pitter, having a series of fruit holders, provided with orifices adapted to be alined relative to the stem axis of the fruit, a pitter adapted to be operated through one of the orifices, said pitter having segmental end cutting surfaces, and a diametrical diaphragm between them adapted to engage the seed, and means for actuating the said pitters, substantially as described.

5. A fruit pitter, having a series of fruit holders, each comprising a bottom seat, a hinged elastic lid, said seat and lid being provided with orifices adapted to be alined with the stem axis of the supported fruit, and a pitter adapted to enter one of said orifices and drive the seed outwardly through the stem end of the fruit and through the elastic opening of the lid, substantially as described.

6. A fruit pitter, having a fixed cam and a rotatable wheel concentrically mounted, a series of fruit holders mounted on the periphery of the wheel formed with top and bottom orifices adapted to be radially alined, a plunging pitter radially supported by the wheel there being one for each holder, and means for rotating the wheel whereby the plungers are serially reciprocated by the same, substantially as described.

7. A fruit pitter comprising a fixed cam and a carrier rotatable in a vertical plane, a series of fruit holders on the periphery of the carrier, each comprising a seat and an upwardly moving hinged lid, said holder being provided with top and bottom orifices alined radially toward the center of rotation when the lids are closed, a plunger pitter for each holder adapted to be actuated by the same to reciprocate the pitter through the bottom orifice and eject the seed through the top orifice, and means for automatically opening and closing said lids, substantially as described.

8. A fruit pitter comprising a fixed cam and a rotatable wheel, a series of fruit holders on the periphery of the wheel, each comprising a bottom seat adapted to support the fruit stem end upward, and an upwardly moving hinged lid, said holder parts being formed with radially alined orifices, a plunger pitter for each holder adapted to be operated by the cam to reciprocate the pitter through the bottom orifice of the holder, a segmental cam arranged relative to the wheel to close the lids prior to the actuation of the plungers to open the lids in position for discharging the fruit after the pitting operation, and to hold said lids in open position during a portion of the movement to receive the fruit, substantially as described.

9. In a device of the class described, a sleeve, a reciprocating pitter therein, a seat having an orifice alined with the bore of the sleeve, a lid hinged to the sleeve and opening upwardly, and an elastic fruit cover on the lid for said seat formed with an orifice through which the seed is ejected, substantially as described.

10. A fruit pitter, comprising a rotary wheel having on its periphery a series of individual holders, a series of pitters radially extended from the center of the wheel and operating outwardly with relation to their respective holders on the periphery of the wheel, the latter being formed with orifices alined with the pitters, and means actuated by the rotation of the wheel and operating in connection with the inner ends of said pitters to reciprocate the pitters and expel the seed outwardly through the stem axis of the fruit, substantially as described.

11. A fruit pitter, comprising a rotary wheel having on its periphery a series of individual holders, and a series of radial pitters on the wheel adjacent said holders, the latter being formed with orifices alined with the pitters, a cleansing tub in which the lower portion of the wheel is immersed during rotation, and means actuated by the rotation of the wheel to reciprocate the pitters and expel the seed outwardly through the stem axis of the fruit, substantially as described.

12. In a fruit pitting machine, a pedestal, a shaft secured to the pedestal, a rotatable wheel on the shaft, radially disposed fruit holders on the periphery of the wheel, fruit clamps arranged to aline with the fruit holders, radially arranged pitter slides inside the periphery of the wheel, pitters disposed in the radial slides, means to close the fruit clamps, means to rotate the wheel, and means to reciprocate the pitters from and to the center of the wheel, substantially as described.

13. In a fruit pitter, a carrier, fruit holders thereon, each comprising a fixed and a movable member formed with orifices, a reciprocating pitter, means for actuating said pitter while the carrier is in motion, and means for moving the movable members of each holder during the carrier travel, whereby the fruit may be placed in the holders, pitted, and discharged, during a continuous rotation of the carrier, substantially as described.

14. In a fruit pitting machine, a receptacle for yieldingly holding the fruit during the pitting operation, said receptacle comprising a fixed member and a member hinged thereto, said hinged member having means forming an elastic cover for clasping the fruit, said receptacle having two orifices, the walls of one of which are elastic, said orifices being alined, and a pitting plunger adapted to enter one of said orifices and eject a pit through the elastic walls of the other.

In testimony whereof, we have hereunto set our hands.

WALTER L. BODMAN.
MAURICE G. RHEINSTROM.

Witnesses:
 OLIVER B. KAISER,
 ROBERT DRAF.

Copies of this patent may be obtained for five cents each, by addressing the "Commissioner of Patents, Washington, D. C."